Aug. 21, 1923.
A. CAMPBELL
LOAD DISCHARGING CAR
Filed Aug. 31, 1922
1,465,756
8 Sheets-Sheet 1
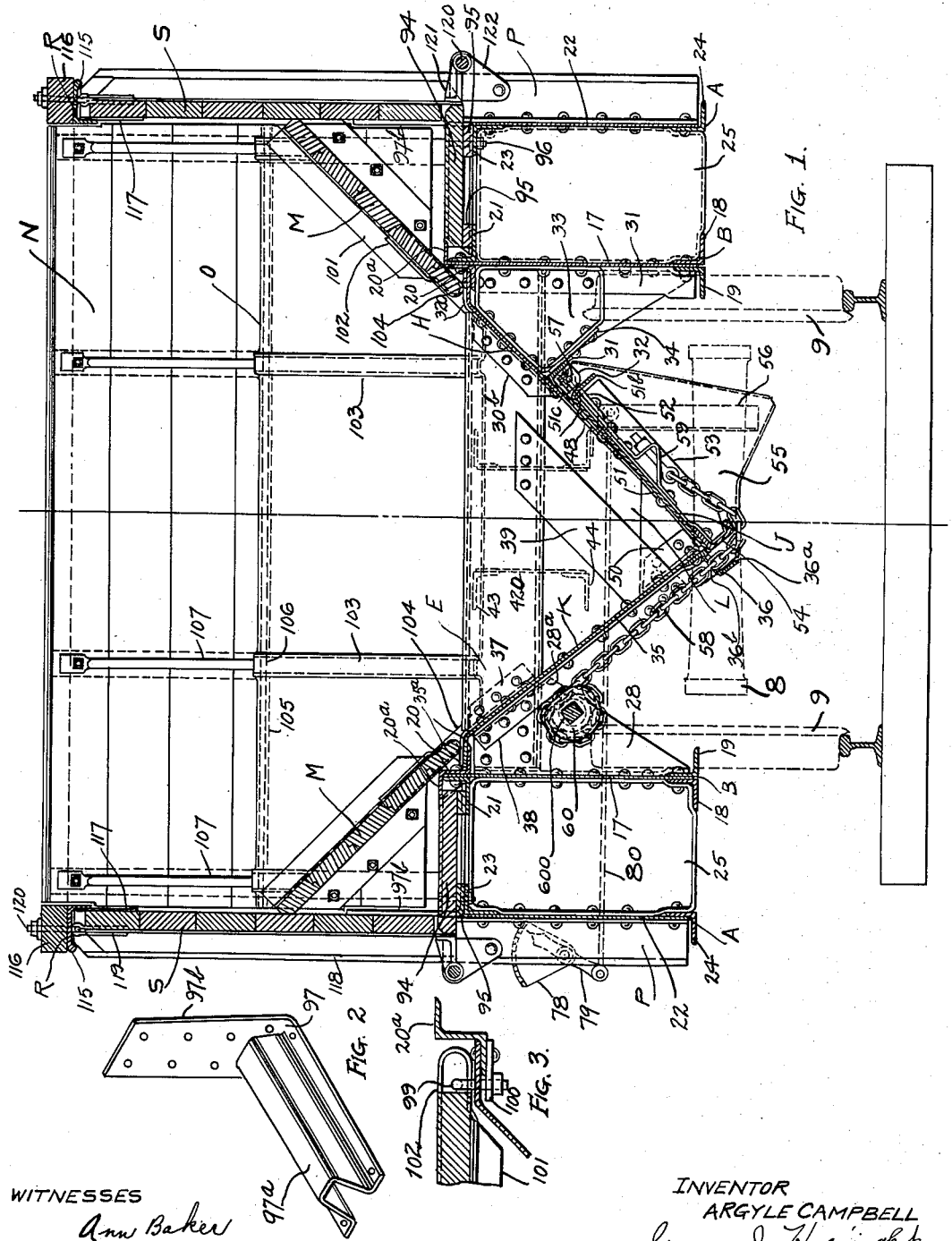
WITNESSES
Ann Baker
INVENTOR
ARGYLE CAMPBELL
BY Geo. I. Haight
His ATTORNEY

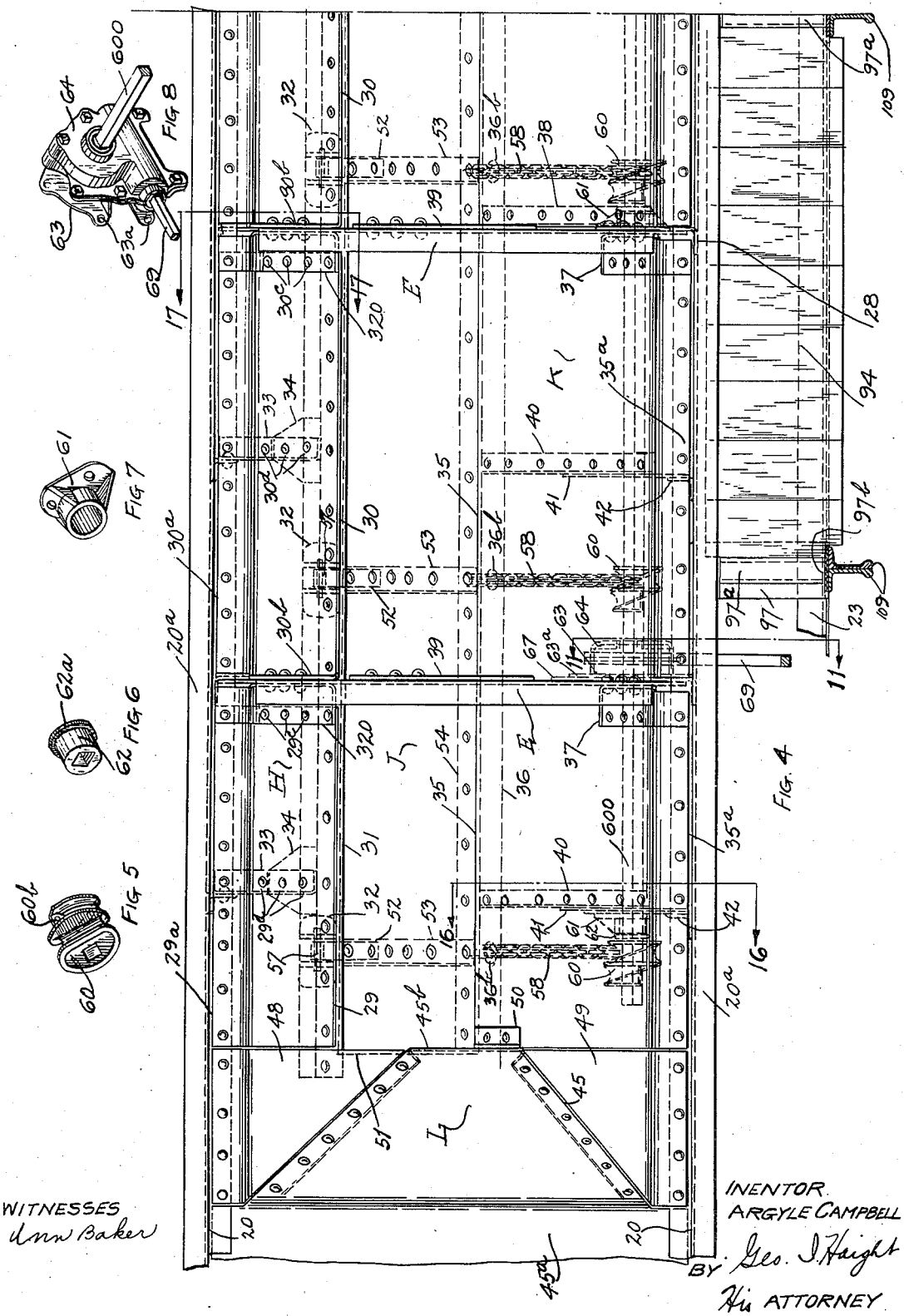

Aug. 21, 1923.
A. CAMPBELL
LOAD DISCHARGING CAR
Filed Aug. 31, 1922
1,465,756
8 Sheets-Sheet 3
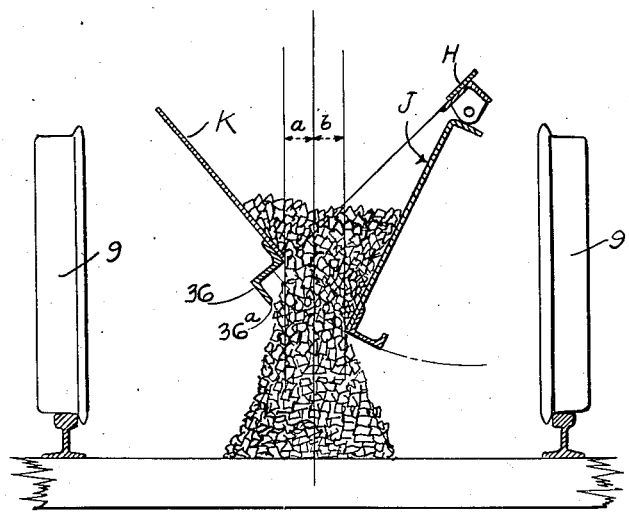
FIG. 9.
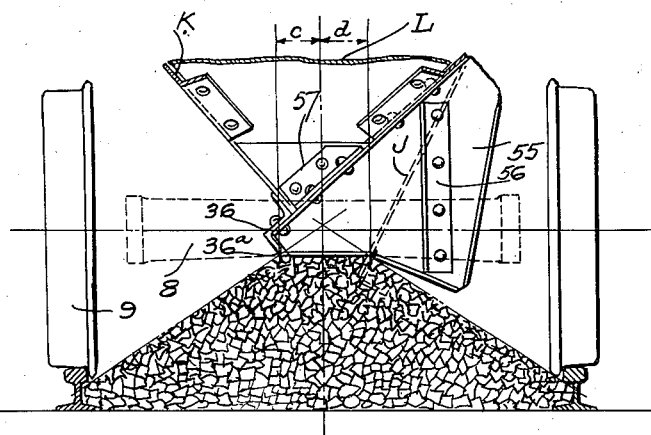
FIG. 10
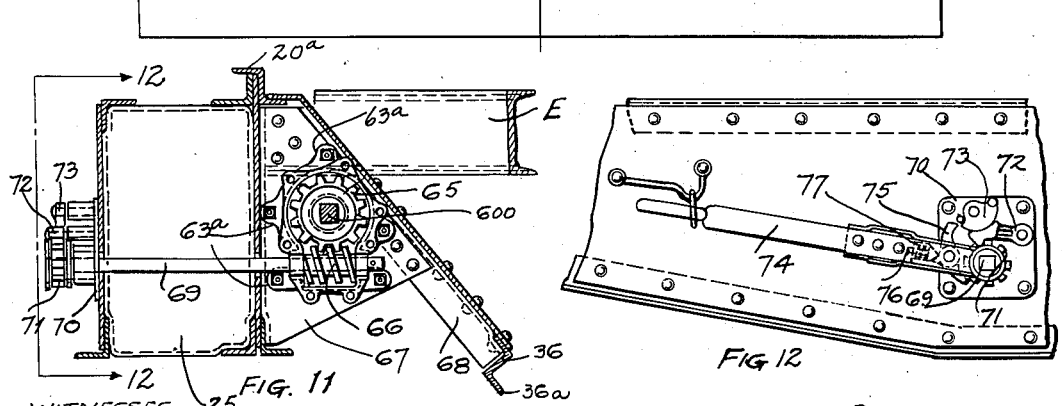
FIG. 11
FIG 12
WITNESSES.
Ann Baker
INVENTOR
ARGYLE CAMPBELL
BY Geo. J. Haight
His ATTORNEY

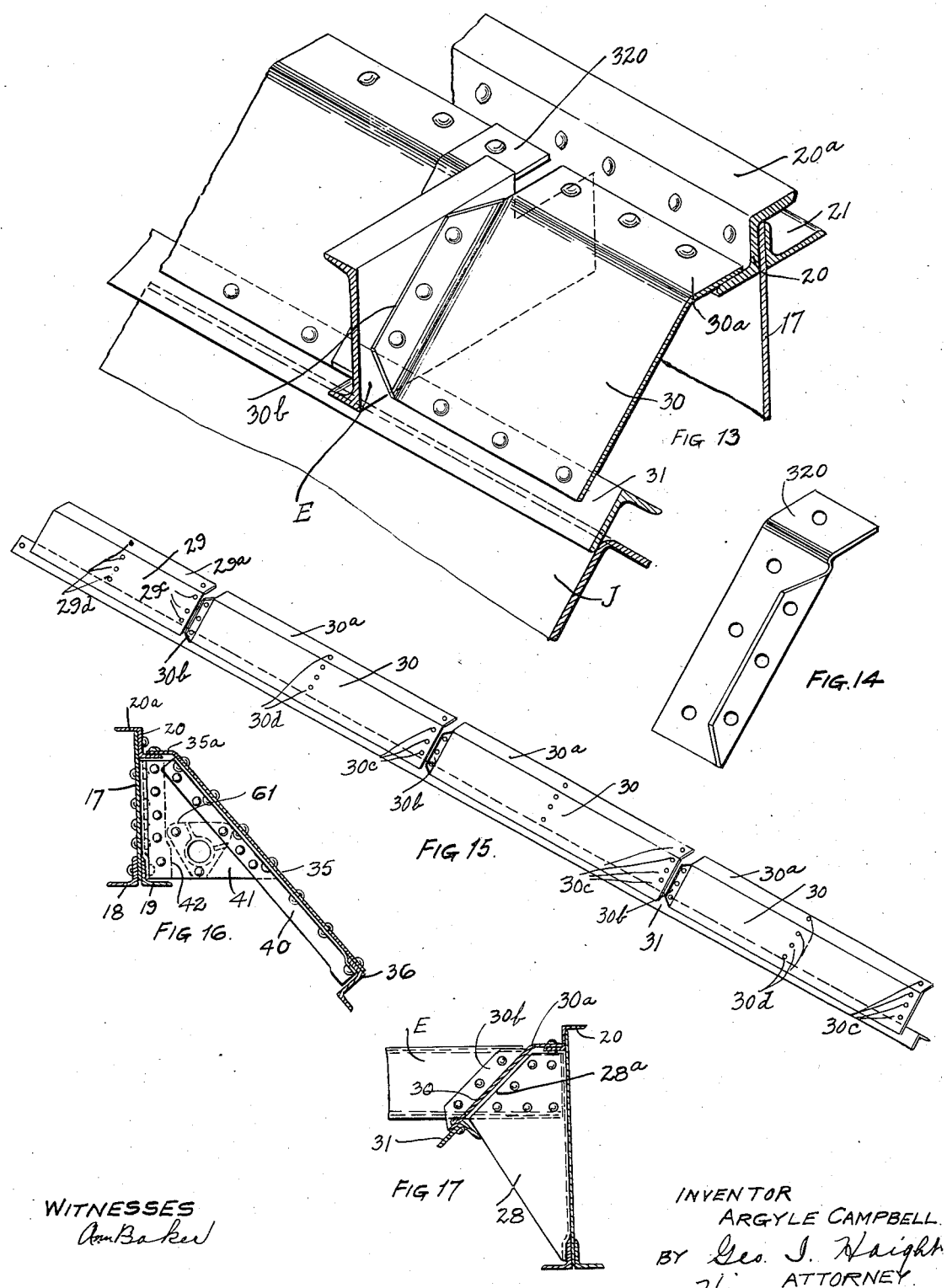

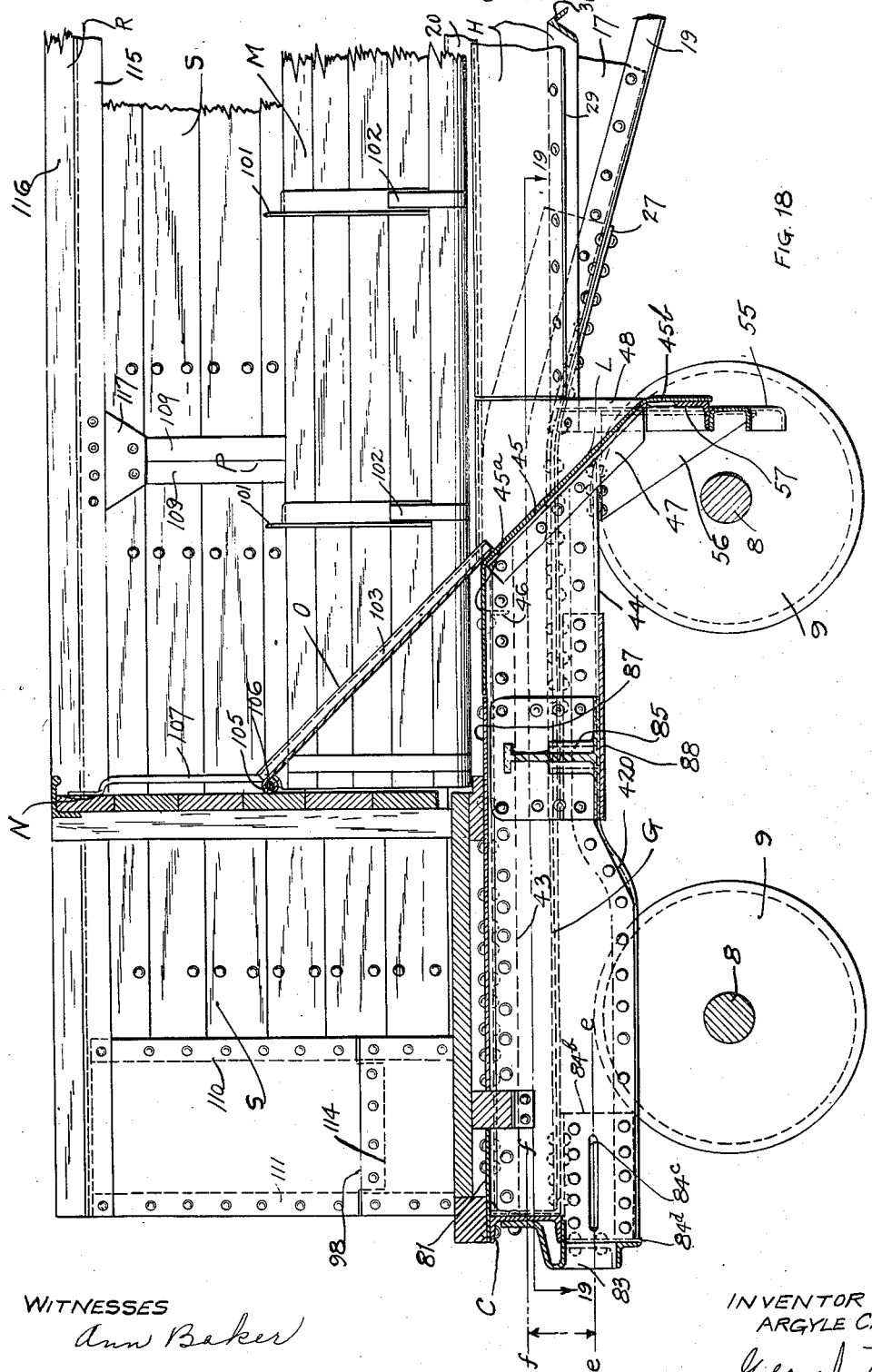

Aug. 21, 1923.
A. CAMPBELL
1,465,756
LOAD DISCHARGING CAR
Filed Aug. 31. 1922
8 Sheets-Sheet 6
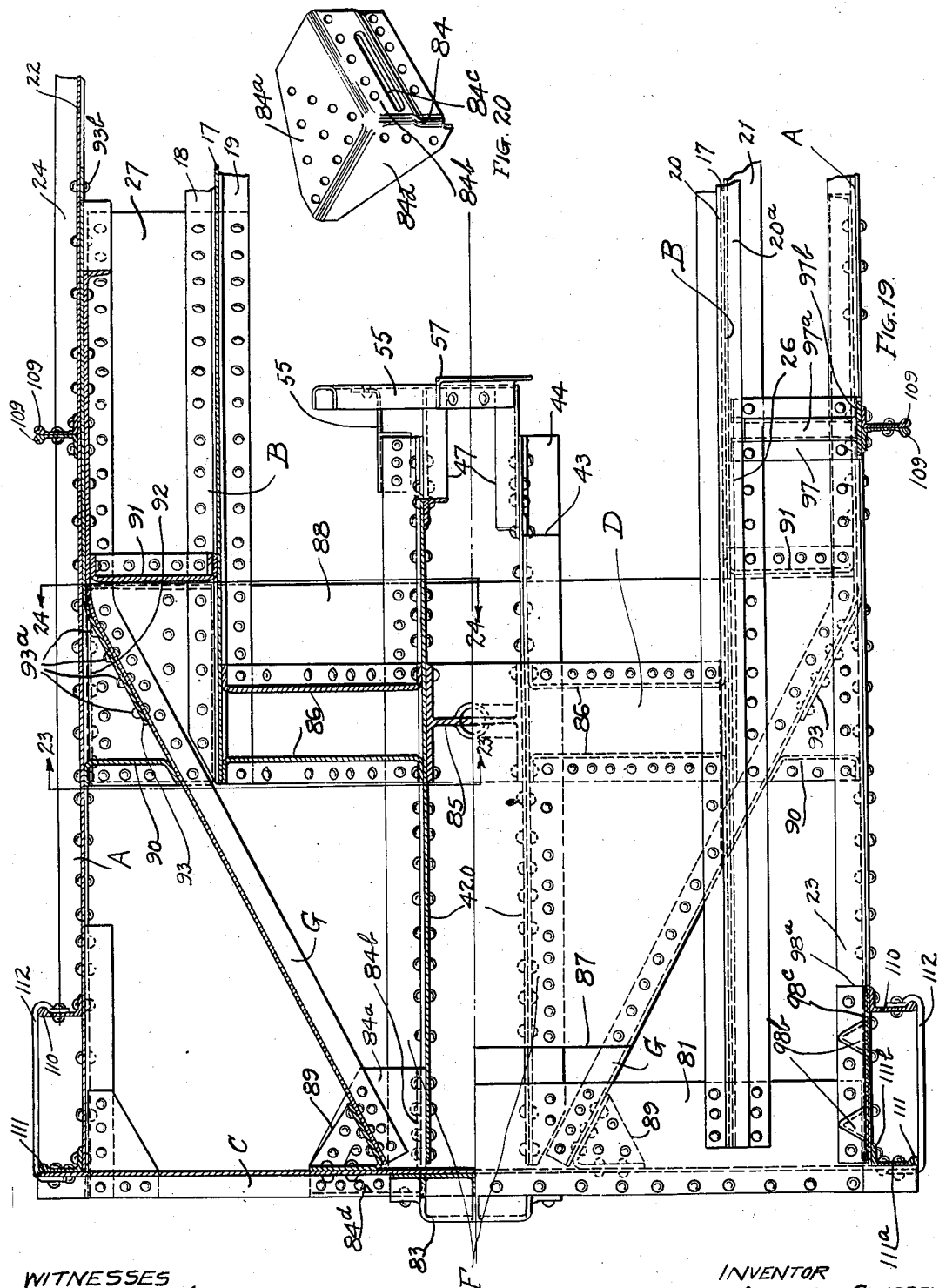
WITNESSES
Ann Baker
INVENTOR
ARGYLE CAMPBELL
BY Geo. I. Haight
His ATTORNEY Aug. 21, 1923.

A. CAMPBELL

LOAD DISCHARGING CAR

Filed Aug. 31, 1922

WITNESSES
Ann Baker

INVENTOR
ARGYLE CAMPBELL
BY Geo. I Haight
His ATTORNEY

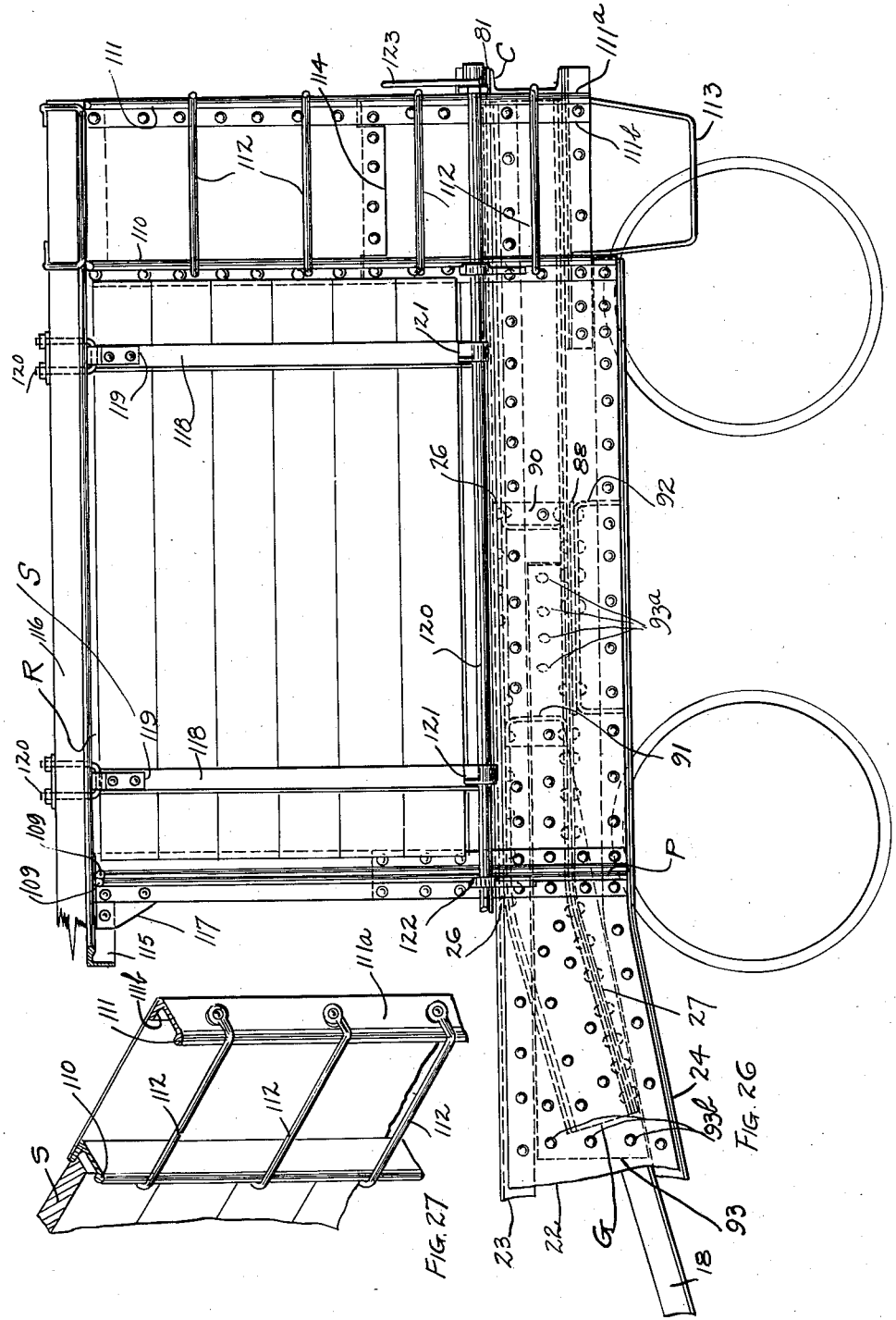

Patented Aug. 21, 1923.

1,465,756

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

LOAD-DISCHARGING CAR.

Application filed August 31, 1922. Serial No. 585,431.

*To all whom it may concern:*

Be it known that I, ARGYLE CAMPBELL, a citizen of the United States, residing at Chicago, in the county of Cook and State of Illinois, have invented a certain new and useful Improvement in Load-Discharging Cars, of which the following is a full, clear, concise, and exact description, reference being had to the accompanying drawings, forming a part of this specification.

This invention relates to improvements in load discharging cars and more particularly to the type known as "ballast cars" used in the construction and maintenance of railroads and provided with a central hopper for dumping between rails and convertible for use as a gondola or for side dumping with top unloading plow.

The primary object of my invention is to provide a center dumping car which will discharge its load centrally of the roadbed and avoid flooding the rails.

A further object of the invention is to improve the structural design of this type of car by combining strength and rigidity of the parts with economy of material and more especially in regard to the framework adapted to withstand the shocks incidental to buff and draft.

Another object of the invention is to provide a center dumping car which will discharge its load uniformly and wherein the flow of ballast will be under perfect control of the operator at all times.

It is also an object of the invention to provide for greater cubical capacity as a hopper car than has heretofore been possible with a given length of door opening.

My invention also resides in certain other features of novelty which will be more fully pointed out in the specification and claims.

In the drawings forming a part of this specification, Figure 1 is a vertical sectional view taken transversely of the car near the center thereof showing the offset construction of the hopper and the position of the convertible floor sections when the car is adapted for use as a center dump car.

Figure 2 is a perspective view of one of the combination rub plates and stake connections.

Figure 3 is a broken sectional view of one of the convertible floor sections in the position occupied when the car is adapted for use as a flat bottom gondola.

Figure 4 is a top plan view of a portion of the car hopper extending from one end thereof to the center of the car.

Figure 5 is a perspective view of one of the door chain winding sheaves.

Figure 6 is a perspective view of one of the door operating shaft collars.

Figure 7 is a perspective view of one of the door operating shaft bearings.

Figure 8 is a perspective view showing the worm and gear casing in assembled relation.

Figure 9 is a diagrammatic view illustrating the normal hopper door opening and showing the flow of ballast which would discharge therefrom with the car in motion.

Figure 10 is a diagrammatic view of the maximum ridge of ballast which can be deposited between rails even when a number of loaded cars pass over the same area with doors in the normal open position.

Figure 11 is a transverse partial sectional view taken on line 11—11 of Figure 4 of the car showing the door raising and lowering mechanism with the front housing removed exposing the worm and gear mechanism.

Figure 12 is a view taken on line 12—12 of Fig. 11 showing the side of the car with the actuating mechanism for operating the worm and gear.

Figure 13 is an enlarged perspective view of the hopper sloping side on the door side showing the novel construction employed therein and its relation in regard to the hopper door.

Figure 14 is a perspective view of one of the connections between the inclined floor and car framework.

Figure 15 is a perspective view in assembled relation of the inclined floor sections and longitudinally extending member.

Figure 16 is a transverse partial sectional view taken on line 16—16 of Figure 4 showing the method of suspending the shaft from the car framing.

Figure 17 is a transverse partial sectional view taken on line 17—17 of Figure 4 showing the connection between the longitudinal sills and crossties.

Figure 18 is a longitudinal section of the car as a hopper showing slightly less than a half thereof, the section being taken to one side of the center of the car.

Figure 19 is a horizontal, sectional view, the upper half thereof corresponding to the section line 19—19 of Figure 18, and the lower half corresponding to a horizontal section at the floor line, both sections illustrating end portions of the car.

Figure 20 is a perspective view of one of the box shaped bracket connections whereby the end sill, draft sills, striking plate and diagonal members are caused to function as a unitary structure.

Figure 26 is a side elevational view of a portion of the car showing my improved corner and side construction as well as showing in dotted lines my improved strengthening means.

Figure 27 is a perspective view showing a portion of my improved corner stake and ladder construction.

Figure 21:
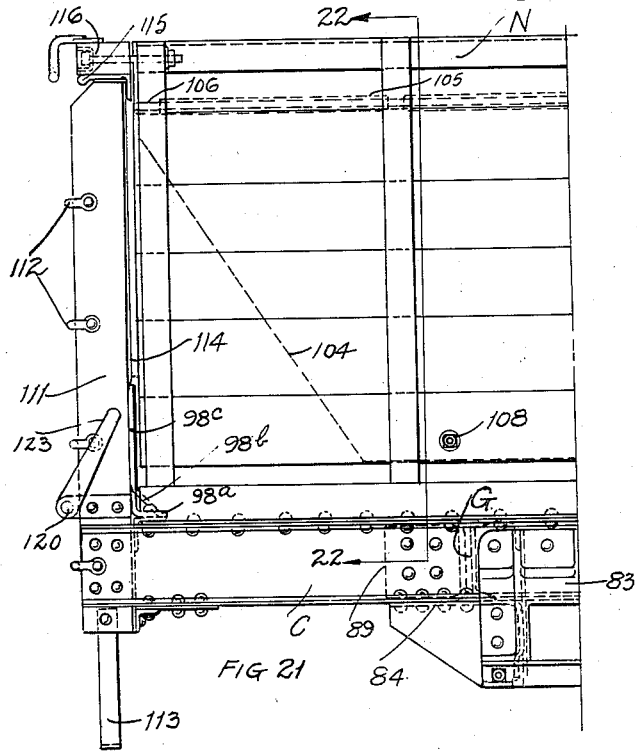
Figure 21 is an end elevational view of one half of the car showing the movable end at one end of the car in position for use as a gondola car.

Referring now to the drawings wherein like characters indicate the same parts, it will be seen that the car consists of a framework composed of heavy longitudinal side sills A and intermediate longitudinal sills B and transverse members comprising end sills C; body bolsters D, crossties E. Non continuous draft sills F are centrally disposed at each end of the car and diagonal members G extend obliquely to the line of draft and connect to the longitudinal sills near the body bolsters. A longitudinal hopper is disposed between the intermediate sills and one side thereof consists of an upper stationary inclined floor H to which the swinging door J is pivoted while the opposite side thereto is composed of an inclined stationary floor K. The hopper is formed at each end with an inclined wall L resting on the draft sills and secured to the stationary inclined side walls of the hopper. Swinging convertible floor portions M are disposed to each side of the hopper forming a continuation of the hopper side walls of the car above the floor. The ends of the car above the floor line consist of movable portions N with inclined shedding members O. The side walls are composed of vertical stakes P, top rail R and swinging side doors S.

Having now given a general outline description of the car, I will proceed to describe with particularity the various features involved in my invention.

Intermediate sills B consist of web plates 17, outer bottom angles 18 and inner bottom angles 19, top Z bar members 20 and outer top angles 21. The top flange of the Z bar 20 extends over the angle 21 thereby sealing the joints between the web plate and sill top members and preventing the entry of moisture and corrosive influences there between. The upper surface (20$^a$) of the Z bar forms a portion of the floor of the car and a runway for the plow protecting the rest of the floor of the car from the destructive effects of the unloading top plow. Side sills A composed of web plates 22, top angles 23, and bottom angles 24, extend the full length of the car and are caused to function in unison with the intermediate sills as load carrying members by means of diaphragms 25, top cover plates 26, and bottom cover plates 27 disposed near the bolsters and secured to both of the said sills. A number of crossties E, preferably of channel shape, extend between the intermediate sills and are secured thereto by means of gussets 28.

The inclined side floor H of the car comprises end plates 29 and intermediate plates 30 secured to a longitudinally extending angle 31, the latter passing beneath cross-ties and secured to the latter and also to the end hopper sections 48. The upper portions of plates 29 and 30 respectively are formed with horizontal ledges 29$^a$ and 30$^a$ adapted to rest on the lower horizontal flange of Z bar 20 and secured thereto, thereby presenting an extension of the Z bar flange of sufficient width to support the convertible floors in both their inclined and horizontal positions. The intermediate floor plates 30 are flanged upwardly as at 30$^b$ for the purpose of effecting a connection with the crossties E while the other end of the plates as at 29$^c$ and 30$^c$ respectively are provided with holes whereby riveted connections are effected between these ends and the cross ties by means of members 320 when the structure as composed of members 29, 30 and 31 has been fitted into place on the car. Door supporting brackets 32 are riveted to this inclined structure and it should be stated at this time the construction as adopted herein favours quantity production inasmuch as the whole side as shown in Figure 15 may be assembled as a unit thereby assuring alignment of the hinges and afterwards quickly fitted into place on the car structure. The gussets 28 are shaped as at 28$^a$ in order that they may be contained beneath the floor instead of passing there through and causing unwieldly and insecure connections between the various parts as has heretofore been the case. Diaphragms 33 support the floor intermediately of the crossties and are riveted or otherwise secured to the floor plates as at 29$^d$ and 30$^d$. Connection between each diaphragm and angle 31 is effected by means of gusset plate 34. In this manner it will be seen that I have provided an upper stationary floor section of great strength and simplicity and furthermore one which presents an unbroken shield for the door thereby preventing the entry of small rocks between the inclined floor and door at the hinge location.

The opposite side "K" of the hopper section is formed of a series of sloping side sections 35 extending downwardly and inwardly from the intermediate sill B towards the longitudinal center of the car. The lower edge of the side K terminates in a plane disposed to one side of the longitudinal central plane of the car, as clearly shown in Figures 1 and 9. The edge terminates on the same side of the central plane as that on which the side K is located, and the amount of offset is indicated by "$a$" in Figure 9. Said free edge of the sloping side K is reinforced by a Z-bar 36. The purpose of this latter member is twofold, acting as a beam to strengthen the floor plate and also having the lower flange thereof constituting a material shield to guard the rail from being flooded by the ballast material. This shield as will be noted from Figure 10 has the controlling point 36$^a$ thereof located a distance "$c$" from the longitudinal center of the car. The sloping floor sections are formed at their upper portions with ledges 35$^a$, and connections with crossties E are made by means of connections 37 and stiffening angles 38. The floor near its free ends is supported from the cross ties by means of tension plates 39. Intermediate of the crossties the sloping plates are supported by means of angles 40 and braced to intermediate sills by means of gusset plates 41 and vertical stiffeners 42 in the manner shown in Figure 16. The end walls "L" of the hopper rest on the draft sills formed of web plates 42$^b$, top angles 43 and bottom angles 44. Each sloping end wall proper consists of a trapezoidal shaped plate 45 bent to form a horizontal floor 45$^a$ and also a vertical wall 45$^b$. The horizontal portion 45$^a$ is secured to the top members of the intermediate sills and stiffened with angle bars 46 between supports. Connection between the draft sills and the inclined floor is made by means of angles 47. The completion of the hopper proper is made by triangular shaped sections 48 and 49 respectively which connect the side and end sloping floors thereby producing a perfect self discharging hopper. An angle 50 connects the vertical hopper end wall 45$^b$ with sloping floor plate 35.

Referring now to the hopper door "J", this member is preferably formed to operate as a single unit although it may be manufactured in sections. In its preferred form it consists of a plate 51 having one end flanged as at 51$^b$ and slotted at 51$^c$ for the passage of hinge straps 52 therethrough. These hinge straps are preferably riveted to the door plate in connection with reinforcing angles 53 which extend up to and are anchored to stiffener 54 which preferably consists of a bulb angle and extends the length of the door. The door is formed to extend beneath the hopper end walls thereby ensuring a tight joint when the door is closed and adjacent to the edge of the door at each end of the car I have disposed an end wall or shield 55 to avoid the escape of material from the car between the edge of the door and the sloping floor section 48 and the lower edge of the hopper end wall 45$^b$. This shield is braced by means of a rearwardly extending vertical gusset 56 which is secured to the draft sill angle and to the shield. This shield is further secured to the end wall by means of angle 57 and also to the Z-bar member 36. The door "J" is adapted to swing on its pivot 57 from hinge bracket 32 and close the door opening. Chains or other flexible elements 58 are disposed at suitable intervals and attached to the door by means of brackets 59, passing through holes 36$^b$ formed in the web of Z-bar member 36 and attached to sheave members 60 as at 60$^b$. The sheaves are rigidly mounted on a shaft 600, preferably of polygonal shape, adapted to rotate in bearings 61 which are secured to the car structure. The sheaves are preferably formed eccentric in order to reduce the leverage or twisting moment on the shaft when the doors are closed and the car is loaded. Collars 62 are mounted on the shaft in order to provide a uniform bearing in brackets 61. In order to prevent lengthwise movement of the same the collars are formed with a flange 62$^a$. The bearings 61 are preferably anchored to the gussets 28 connecting the crossties E to the intermediate sills, but towards the end of the hopper provision is made for supporting the shaft from the floor supporting gusset 41. The doors are opened and closed by means of gearing, preferably enclosed in a dust and oil proof housing formed of a plurality of sections 63 and 64 respectively as shown in perspective in Figure 8. These sections are bolted or riveted together and in Figure 11 I have shown the interior view of the mechanism with outer casting 64 removed showing the gear 65 and worm 66. The gear 65 is rigidly secured to shaft 600 and is preferably disposed intermediately of some of the sheaves in order that the twisting moment on the shaft may be distributed on either side of the gear. Housing section 63 is provided with bracket portions 63ª whereby the housing is secured to the car structure preferably at one of the crossties E and below the sloping floor and adjacent to the intermediate sill. For this purpose I provide an enlarged gusset 67 of the same type as hereinbefore designated as 28 and provide connecting angle 68 between the sloping floor and this gusset. A driving shaft 69 is rigidly secured to the worm gear 66 and passes through the intermediate and side sills through a combined reinforcing and ratchet plate 70. This plate, which is securely riveted to the side sill web to reinforce this member and compensate for the hole made therein, has a bearing for ratchet 71 and also provides pivotal bearings for pawl 72 and dog 73. Actuating mechanism is provided by the lever handle 74 which carries pawl 75 whereby the ratchet 71 is engaged. Pawl 75 is held into engagement with the ratchet by means of plunger 76 and spring 77.

Reference to Figure 1 will show that the apex of the hopper when the door is closed is disposed to one side of the longitudinal center of the car and the extent of this offset is preferably made substantially one half of the normal door opening used in ballasting operations with material of average density, thereby obtaining with the stationary side hopper the same advantages which would be derived from the use of a double door car inasmuch as the door opening at this stage will be the equivalent of a V shaped hopper having both sides thereof movable and of uniform travel. In this manner when the door "J" is opened to this average distance the center of the discharge opening will be substantially the center of the car and also the center of the roadbed. This is clearly illustrated in Figure 9 wherein the extent of the offset from the center of the car is designated by the letter "a" and wherein the door is opened an equal distance to the other side of the center of car as designated by the letter "b". In this diagram the flow of material as illustrated would be that discharging from a moving car. A greater or lesser flow would be secured by varying the speed of the moving car. By this offset hopper construction I attain in a cheaper construction the advantages embodied in a well known double door ballast car, i. e., placing the ballast in the center of the track. Center dump hoppers extending longitudinally of the car with the apex of the hopper located on the longitudinal center of the car have been used for a number of years, but owing to the fact that the discharge door opening is entirely confined to one side of the track it is found that the ridge of ballast is deposited to one side, flooding the rail and causing derailment of trains and entailing much lost time. A further advantage secured by my offset construction lies in the steep angle which the slope "K" makes with the horizontal plane preventing adherence of the lading to the hopper side and thereby overcoming a defect which has hitherto rendered cars with a hopper embodying a fixed side unreliable for center ballast work. It is well known to those having practical experience with center ballast work that it is customary for the operator controlling the discharge of the load to gauge the door opening largely by the extent of the flow of material issuing from the discharge opening, inasmuch as it is impossible from his point of vantage, i. e., the point of operation of the doors, to see the door itself. Consequently it is a matter of frequent occurrence that due to the insufficiency of the slope in the hopper floor the material arches in the car and does not flow freely and the operator, in ignorance of this fact, seeing little or no flow of ballast, opens the door to such an extent that when rupture of the arch is effected there is an onrush of material which covers the rail and causes a derailment of the moving car. I have guarded against this possibility by offsetting the stationary side of the hopper, thereby providing a slope at an angle considerably in excess of the angle of repose of the material and greater than heretofore employed in cars of this type. Furthermore, I have provided automatic means as shown in Figure 1 to indicate to the operator the extent of the door opening at all times. This includes a dial plate 78 secured to the car framing, an indicator 79 pivoted to the dial and connecting means 80 extending from the indicator and connected to the door.

The mode of operation is as follows: It being desired to center ballast a section of track, the loaded train of cars is brought into position and safety locking pawl disengaged from the ratchet 71 on all the cars. The lever of the forward car is then rotated in a clockwise direction turning the worm and shaft and resulting in a gradual and controlled opening of the door and the train is set in motion. As the door opens the rod 80 is drawn inward, moving the indicator 79 and indicating on the dial scale the extent of the door opening. The opening of the door is then continued until the indicator on the dial shows that the normal door opening has been reached, which as shown in Figure 9, is when the door opening is substantially equal on both sides of the longitudinal center of the car. If a very light run of ballast is desired, the train is moved at a higher speed and the doors of the various cars composing the train opened in succession, i. e., immediately one car becomes empty the next one in the train is opened thereby forming a continuous ridge of ballast between rails.

It is often desired to deposit in one run the maximum amount of ballast which can be safely placed between rails without danger of derailing the cars or preventing a train from passing over the track. When such is the case, the train of cars is moved into position and a number of the cars are opened to the normal position as shown in Figure 10 and the train is set in motion, moving at a very slow speed. The ballast in the various cars will discharge substantially as shown in Figure 9 and gradually spread out until it assumes the position shown in Figure 10 which indicates the ridge of ballast free of the wheel and having the slopes thereof at the inclination made by the angle of repose of this material. It is appreciated that the free edge of the door when in the normal open ballasting position will be somewhat closer to the rail than the controlling point $36^a$ of the stationary side and it would appear at first sight that the ballast would be controlled on the door side of the car by this free edge, but in order to compensate for this condition, I have made provision at each end of the hopper opening for a certain amount of ballast to flow over the edge of the door and thereby provide for a uniform distribution on either side of the longitudinal center of the car. Referring to Figure 10 it will be noted that the height of the controlling point $36^a$ is substantially in line with the lower surface of the axles 8 and I have extended the lower surface of the material shield at this same level and substantially equal distances on either side of the longitudinal center of the car, thereby providing with a moving car the equivalent of a centrally disposed discharge opening equal in length to the hopper opening and equal in width to the distance "c" plus "d".

The confining limits of the ballast ridge are located substantially at the intersection of planes made by the natural slope of the material when just below the level of the rails and clear of the wheels 9 and a plane representing the lower surface of the axles. It will therefore be apparent to those skilled in this art that with a train composed of such cars loaded and with the doors of every car opened to the indicated position the flow of ballast will be confined between the rails and free of the wheels of the car.

In order to make my load discharging car applicable to a great variety of uses such as dumping coal and ore in center hoppers, I have rendered it possible for the door to open a greater extent than I have indicated on the diagrams in Figures 9 and 10, by providing a sufficient length of chain on the sheaves to permit the door to swing to a vertical position.

In my former designs of center ballast cars employing double doors I have provided an I-beam longitudinal center sill centrally disposed of the hopper for the purpose of sustaining the buffing and pulling stresses. In the construction of this type of cars with double doors the disposition of a center buffing member within the hopper did not materially interfere with the discharge of the load, but with one of the sides of the hopper rigidly fixed I find it desirable to provide an unobstructed door opening in order to ensure proper discharge of the load. Consequently I have embodied in this invention a novel form of construction for transmitting the buffing and pulling strains from the centrally disposed draft sills to the heavy side girders composed of intermediate and side sills which are widely spaced from the longitudinal center of the car in the manner already described.

Intermediate sill web 17 and bottom angles are extended only as far as the body bolsters and included in the construction thereof while the top Z-bar 20 and the top angle 21 are extended longitudinally to the end of the car and secured to the end sill cover plate 81. The end sill is preferably formed of a channel "C" to which is attached a striking plate 83. Connections between the draft sills, striking plate and end sills are effected by means of a box shaped member 84. The box shaped member 84 is formed with horizontal flange $84^a$ secured to lower flange of the end sill and to the lower flange of the member G both of which are substantially on the same plane. Vertically and longitudinally extending flange $84^b$ is secured to the draft sill and formed with a slot $84^c$ for the passage of a draft key (not shown). A vertical transversely disposed flange $84^d$ is secured to the striking plate 83. In this manner the end of the car is effectively braced against lateral, transverse, oblique and longitudinal strains. Disposed within the draft sills is the usual center block 85 and upright vertical portions 86 are disposed between the draft sills and intermediate sills. Extending transversely across the car between the intermediate sills and secured thereto and to the vertical bolster portions and draft sills is a bolster top cover plate 87. This plate is extended toward the end sill and secured to the diagonal members G which in this particular instance consists of a channel member. Extending transversely of the car and secured to the lower portions of the bolster vertical portions and to the draft sill and intermediate sills a wide bolster bottom plate 88 is disposed at each end of the car. Heretofore it has been customary to transmit draft shocks from the center or draft sills to the side sills, utilizing the bolster as a beam and thereby placing the bolster top and bottom plates under an undue strain.

In such cars difficulty has been experienced due to rivets loosening and shearing after a period of service due to the fact that the bolster plates are called upon to perform the dual function of sustaining the vertical load and also transmitting draft shocks. Now in my invention I have devised a method whereby such strains are transmitted obliquely to the line of draft directly from the longitudinal center of car to the heavy side girders. The structure whereby this result is accomplished consists of the members G preferably of channel shape each having the upper flange secured to the end sill cover plate 81 and the lower flange secured to the box shaped member 84. A further connection is made between the diagonal member G and the end sill by means of a connecting member 89 securely anchoring the member G to the end sill. The members G extend within the longitudinal girders and are secured thereto by means of their upper and lower flanges connecting respectively to the top and bottom plates 26 and 27 of the girder. Furthermore, each of the members G extends co-extensively with the side sill for a considerable distance and is riveted to the web of the side girder thereby increasing the cross sectional area of this girder and greatly increasing its load carrying capacity. Referring to Figures 19 and 26 it will be observed that the intermediate sill is very shallow as it passes over the wheel and gradually increases in depth as it recedes from the bolster towards the center of the car. The side sill is likewise restricted in depth but in a lesser degree. I have therefore made provision to strengthen the girder by bending the member G inwardly and downwardly in such a manner that the lower flange thereof will extend co-extensively with the lower surface of the girder and also of the bottom plate 27 which extends transversely of the girder and is riveted to the lower flange of the channel G and to angles 18 and 19 of the intermediate sill. A box shaped flanged diaphragm 90 is disposed between the side sill and member G and riveted to both of these members. Another diaphragm 91 similarly formed is disposed between the member G and the intermediate sill and formed with an upper flange secured to top cover plate 26, a flange secured to bottom cover plate 27 and vertically extending side flanges secured to the side and intermediate girders respectively. The cover plates 26 and 27 extend longitudinally of the car from the edge of the bolsters and are secured to the diaphragms 90 and 91. The top cover plate 26 which is secured to the top angle 21 of the intermediate girder and also to the top angle 23 of the side girder besides forming a reinforcing member for the side girder also constitutes an extension of the bolster top plate.

Figure 23:
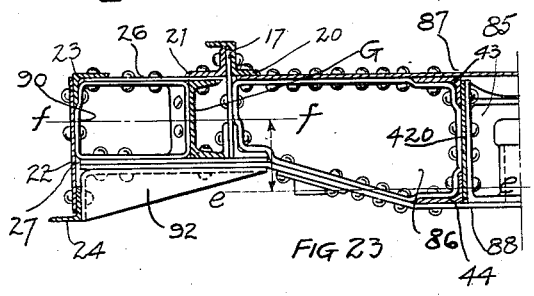
Figure 23 is a transverse sectional view of one half of the bolster taken substantially on line 23—23 of Figure 19.
Figure 24:
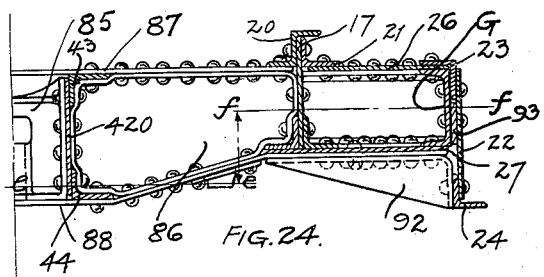
Figure 24 is a transverse sectional view of one half of the bolster taken substantially on line 24—24 of Figure 19.
Figure 25:
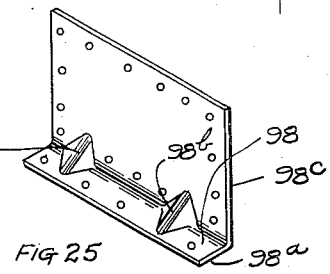
Figure 25 is a perspective view of the rub plate and corner post connection.

Referring to Figure 23 and Figure 24, it will be noted that the side sill extends below the level of the bolster bottom plate and I have secured to the bottom member thereof a flanged member 92 which acts as a connection between the side and intermediate sills and also prevents the side sill from buckling when it becomes necessary to jack a loaded car. Bottom cover plate 27 is interposed between the intermediate sill bottom angles and the bolster bottom cover plate. The portion of the side sill which projects below the bottom angles of the intermediate sills balances the portion of the intermediate sills which projects upwardly into the car above the side sill top angles and in this manner a more uniformly balanced girder section is secured. Under buffing strains the force incidental thereto is resolved into a force acting obliquely through members G placing these members in compression and another force acting transversely of the car placing the top cover plate 87, side girder cover plates 26 and 27 and bolster bottom cover plate 88 and connection 92 in tension. Under draft or pulling strains the members G are placed in tension and diaphragms 90 and 91 and bolster vertical portion 86 and center block 85 are placed in compression. It will be apparent that the entire force of the buffing or pulling strains may be transmitted in an oblique direction or only a definite proportion thereof in this manner. In providing at each end of the car a trussed trapezoidal shaped structure whereof the base is the body bolster or the distance between side girders, a theoretically correct structure is provided which takes care in a most effective manner of horizontal stresses due to buff, and draft strains. In the disposition and attachment of the parts forming this structure I have provided for strength in a vertical as well as a horizontal plane. In cars of this type wherein the depth of the load carrying sills is restricted by the wheels and truck parts the center of gravity of the said girders is situated at a considerable distance above the line of draft designated herein as $e-e$ and the neutral axis of the side girders as $f-f$. In this particular car this distance is substantially 9 inches which tends to produce an undesirable eccentric loading on the girders due to buffing and pulling strains. I have therefore provided for increased strength of the girders throughout the length of their restricted depth by increasing the sectional area of the sills by the top and bottom plates 26 and 27 and extending the members G downwardly and longitudinally of the car, thus transmitting the strains to the sills at points where they are of greater depth and greater strength. I have also strengthened the web of each side sill by means of gusset plate 93 which is secured to member G, independently of the side sill by means of rivets 93$^a$ and to the side sill independently of the member G by means of rivets 93$^b$ and in the manner already described with top and bottom cover plates. Adjacent to the hopper I have provided floor portions 94 resting on nailing pieces 95 and supported by intermediate sill top angle 21 and side sill top angle 23. The floor is extended beneath Z-bar top flange 20 and maintained in position thereby and also protected from the plow. The opposite end of the floor is bolted to the side top angle by means of bolts 96. At each of the intermediate vertical stakes "P" I have provided a combination member 97 shown in Figure 2 having a horizontal flange extending from sill to sill and secured thereto and having a pressed U-shaped corrugation therein presenting a surface 97$^a$ for the plow to ride on. The member is formed with a vertical portion extending upwardly and secured to the stake, the inner surface thereof 97$^b$ constituting a rub plate. The connections 97 are disposed at intervals between the boards with the surfaces 97$^a$ forming metallic wear plates on the side floor portions thereby saving the boards from the destructive effects of the plow. At the corner post I have disposed a combination rub plate 98 of a somewhat different construction as shown in Figure 25. This member consists of a horizontal portion 98$^a$, upright rub plate portion 98$^c$ and a reinforcing brace 98$^b$ pressed therein stiffening the angle.

Figure 22:
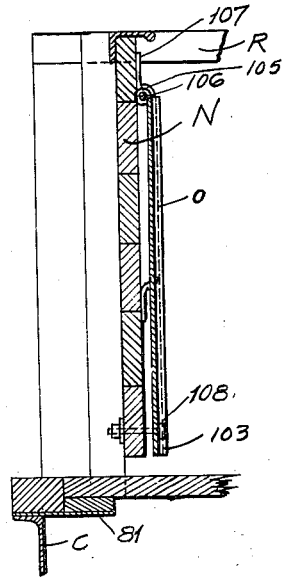
Figure 22 is a sectional view of the car taken substantially on line 22—22 of Figure 21 showing the disposition of the sloping floor member when the end is in position as a gondola car.

The car is convertible from a center dump car to a flat bottom gondola car by the fact of being provided with convertible swinging bottom sections M loosely pivoted to the intermediate sills in the manner shown in Figure 3 by means of U bolt 99 secured to brackets 100. The swinging sections are provided with stiffeners 101 and reinforcing strap 102 forming flat bottom portions for the car in one position as shown in Figure 3 and being movable to form inclined hopper portions in another position as shown in Figure 1. In the present instance I have increased the length of the swinging side portions for a considerable distance beyond the ends of the lower fixed hopper portion whereby the distance between the movable ends N of the car may be increased with a consequent increase in the capacity of the car as a hopper and without any resultant increase in the length of the car between trucks. In order to make the car entirely self-discharging I have provided a flap forming an inclined shedding plate O extending from the movable end to the fixed lower hopper, thereby forming an upward extension of the lower hopper end wall. The flap preferably consists of a sheet metal plate reinforced with corrugations or stiffeners 103 and having its edges 104 sheared to conform with the slope of the hopper sides. The upper portion is preferably bent in the form of a loop 105 thereby providing a combined reinforcement and hinge through which a continuous rod 106 passes. The shedding member is maintained in position by means of a rail member 107 on the movable end. When the car is converted into a gondola as shown in Figure 22 the flap is moved to a vertical position, the hinge rod sliding upwardly in the slot formed by the rail and the corrugation in the flap fitting over the rails. In this manner the flap occupies very little place and is secured in its vertical position preferably by means of bolts 108.

With the convertible floor sections M in the horizontal position and the movable ends N removed from the car, unloading is effected by means of an unloading plow through the side doors S and for the purpose of effectively supporting the side doors I have provided a novel frame work consisting of intermediate stakes P each formed of two bulb angles 109 placed back to back and anchored together and secured to the side girders directly by means of rivets and also through the medium of connection 97. At the corner posts I have disposed two bulb angles 110 and 111 in the same direction, spacing them apart sufficiently to form the stiles of a ladder to which ladder treads 112 are attached and at the lower portion thereof sill step 113 as shown in Figures 26 and 27, thereby providing a safe ladder immediately adjacent the end of the car and wherein a man is fully protected from the swinging side door and discharging load.

By means of stake member 111 which has its web 111$^a$ disposed transversely of the car and riveted to the end sill C and its wide flange 111$^b$ secured to the side sill A, a very strong anchorage is thereby obtained for the lower portion of the corner post. Above the side sill the bulb angles 110 and 111 are secured to the combination rub plate 98 which extends from one to the other of these members and is riveted thereto. Above the combination rub plate a plate 114 completes the corner post construction. The top rail R member consists of a bulb angle 115 and a wooden beam 116. The vertical flange of the bulb is secured to the stakes P by rivets and gusset 117 and also riveted to the corner posts. Swinging side doors S are formed with battens 118 and hinges 119 and swing from U bolts 120 supported by the top rail. Door locking mechanism consists of a longitudinally extending shaft 120 having arms 121 fixed rigidly thereto adapted to engage the battens 118. Shaft supporting bearings 122 are riveted to the stakes and operating lever arm 123 rigidly fixed to the shaft and disposed at the end of the car.

While I have shown in detail a car embodying my improvements and have described the same with minuteness it is to be understood that I have done so for the purpose of demonstrating more clearly the novel features of my invention and not by way of limitation and I claim all construction which may come within the scope and spirit of the following claims:

What I claim is:

1. In a load discharging car having a central hopper and floor portions adjacent thereto, in combination, a longitudinally extending girder comprising a web having secured on one side thereof a top member composed of a Z-bar, the top flange of the said Z-bar constituting a portion of the floor of the car and the lower flange of the said Z-bar forming a support for downwardly and inwardly inclined sides of the longitudinally extending hopper.

2. In a load discharging car, the combination of a supporting framework comprising longitudinal sills widely spaced apart, transverse beams extending from sill to sill and a series of inclined floor plates disposed between the transverse beams and connections between the said transverse beams and floor plates disposed to either side of the said beams and above the said inclined floor plates and connected thereto, the transverse beams being connected to the longitudinal sills by means of gussets contained beneath the said inclined floors.

3. In a load discharging car, in combination, longitudinal sills, a V-shaped hopper having one side thereof formed with a discharge door, transverse beams passing through the hopper and secured to the sills, supporting means for the aforesaid hopper door comprising an angle extending continuously below the transverse beams and having hinge brackets secured thereto, inclined floor plates disposed between the transverse beams and supported by the angle and the sill, diaphragms disposed intermediately of the transverse beams and secured to the sill and a gusset connection between the longitudinal angle and the said diaphragm.

4. In a load discharging car adapted to deposit ballast between rails, the combination of a supporting framework, a hopper composed of longitudinally extending oppositely inclined sides, one of such sides having a pivoted door and the opposite side thereto being stationary and having a material shield formed near the free end thereof; the said material shield being spaced from the inclined stationary side and having a flexible element passing between the shield and floor side and connected to the door.

5. In a load discharging car of the class described, the combination of a car body having a longitudinally disposed V-shaped hopper, longitudinal sills disposed to each side of the said hopper whereof the top members present oppositely disposed Z-bars, each of the said Z-bars having the upper flange forming a portion of the floor of the car and the lower flange forming a support for a swingingly mounted door arranged to form in one position a portion of the horizontal floor of the car and to be swung upwardly from the horizontal position to form a portion of a hopper side.

6. In a load discharging car, the combination with end sills, body bolsters and centrally disposed non-continuous draft sills of longitudinally disposed intermediate sills spaced outwardly from the said draft sills to accommodate a hopper; the said intermediate sill each comprising a web, bottom members and top members; the web and bottom members of the said sill extending only from bolster to bolster and the top members extending from end sill to end sill.

7. In a load discharging car, the combination with end sills, body bolsters and centrally disposed non-continuous draft sills of longitudinally disposed intermediate sills spaced outwardly from the said draft sills to accommodate a hopper; the said intermediate sills each comprising a web, bottom members and top members; the web and bottom members thereof extending from bolster to bolster and the top members thereof extending from end sill to end sill and constituting floor carrying members.

8. In a railway car, the combination with an end sill of centrally disposed draft sills, side sills and intermediate sills extending lengthwise of car, bolsters extending transversely of the car and having fixed vertical portions extending between the draft sills and intermediate sills, a top cover plate extending between the intermediate sills, top cover plates extending between the intermediate and side sills, a draft member inclined to the longitudinal sills and extending from each side of the draft sill at the junction of the same with the end sill and extending between the side and intermediate sills and spacing members adapted to space the said brace from the sills.

9. In a railway car, the combination with longitudinal girders widely spaced from the longitudinal center of the car and composed of intermediate sills and side sills, each of the said girders having top and bottom cover plates, a body bolster extending transversely thereof and having at its end portions between the said intermediate and side sills a draft member extending in an oblique direction horizontally and secured to the bolster cover plates.

10. In a railway car, the combination with centrally disposed draft sills, intermediate sills and side sills spaced outwardly from the said draft sills, a bolster having vertical sections lying between the draft sills and intermediate sills, a bottom cover plate extending continuously from side sill to side sill and a draft member disposed angularly to the line of draft and secured thereto.

11. In a railway car having a central longitudinally extending V-shaped hopper for the discharge of material, the combination of end sills, side sills, intermediate sills and draft sills arranged for carrying the load and taking care of buff and draft strains, diagonal members connecting said end sills, draft sills and intermediate sill members together forming a trapezoidal shaped structure at each end of the car body whereby shocks received by the draft sill members are transmitted directly along the lines of the diagonal members to the side and intermediate sills.

12. In a railway car, the combination of a structure composed of end sills, non-continuous centrally disposed draft sills, side sills extending continuously from end sill to end sill, draft members secured to the end sill and draft sill and extending in an angular direction towards the side sill and secured thereto, intermediate sills spaced outwardly from the draft sills and composed of top members, bottom members, and web; the said bottom members and web being contained within the structure made by the angularly disposed members, the aforesaid top members being extended over and beyond the said draft members and secured to the end sill.

13. In a railway car, the combination of centrally disposed draft sills, longitudinal girders spaced outwardly from the line of draft, and comprising side sills and intermediate sills, channel members extending diagonally from the ends of the car near the center thereof and each having the web, top flange and bottom flange thereof secured to the said girders.

14. In a railway car, the combination with an end sill and draft sill of a connection therebetween presenting a box shaped member having a vertical wall secured to the draft sill, a horizontal wall secured to the end sill and a transverse vertical wall uniting the said horizontal and vertical walls.

15. In a railway car, the combination of an end sill, draft sill and striking plate, a connection between the said members comprising a box shaped pressed member having a vertical wall secured to the draft sill, a horizontal wall secured to the end sill and a transverse wall uniting the said horizontal and vertical walls and secured to the striking plate.

16. In a railway car having a centrally disposed draft line the combination of an end sill, draft sill, draft members adapted to transmit buffing shocks obliquely to the line of draft, a connection between the aforesaid members comprising a box shaped member having a vertical wall secured to the draft sill and a horizontal wall secured to the end sill and to the said draft member and having a transverse wall uniting the said horizontal and vertical walls.

17. In a railway car having a centrally disposed draft line, the combination of a vertically disposed channel shaped end sill having a top cover plate, draft members substantially equal in depth to the end sill and disposed on either side of the longitudinal center of car and adapted to transmit buffing shocks obliquely to the line of draft, each of the said members being secured to the end sill top cover plate and having a connection secured to the lower flange of the channel shaped end sill.

18. In a railway car, the combination of a centrally disposed striking plate forming the outer end of a trussed trapezoidal shaped structure, longitudinally disposed intermediate and side sills, a body bolster extending transversely thereof and forming the base of the said structure, diagonal members forming the sides of the said structure and constituting means whereby buffing stresses are transmitted from the said striking plate to the side and intermediate sills in a diagonal direction.

19. In a railway car, the combination of a transverse member disposed at the end thereof and having a buffer striking plate attached thereto, longitudinal sill members spaced outwardly from the center of car, a bolster extending transversely thereof, members converging from the end of the bolsters towards the longitudinal center of car and the said transverse end member and a box member interposed between the said transverse end member and converging member.

20. In a railway car, the combination of longitudinal side girders spaced apart to provide dumping space therebetween, body bolsters extending transversely thereof, diverging members extending from the ends of the car through the said bolsters and paralleling the said girders for a limited distance beyond and between bolsters.

21. In a railway car, the combination of longitudinal side girders spaced apart to provide dumping space therebetween, body bolsters extending transversely thereof, diverging members extending from the ends of the car through the said bolsters and paralleling the said side girders for a limited distance beyond and between bolsters and being secured to the said side girders.

22. In a railway car, the combination of longitudinal side girders spaced apart to provide dumping space therebetween, body bolsters extending transversely thereof, diverging members extending from the ends of the car through the said bolsters and paralleling the said side girders for a limited distance beyond and between the body bolsters; each of said members having a connection with the said side sills through the medium of a gusset having a portion thereof secured to the said member independently of the side girder.

23. In a railway car, the combination of longitudinal side girders spaced apart to provide dumping space therebetween, body bolsters extending transversely thereof, diverging members extending from the ends of the car through the said bolsters and paralleling the said side girders for a limited distance beyond and between the body bolsters; each of said members having a connection with the said side sills through the medium of a gusset having a portion thereof secured to the said side girder independently of the said member.

24. In a railway car, the combination of longitudinal side girders spaced apart to provide dumping space therebetween, body bolsters extending transversely thereof, diverging members extending from the ends of the car from each side of the longitudinal center thereof and passing through the said bolsters and paralleling the said girders for a limited distance beyond and between bolsters, said members being inclined downwardly after passing through said body bolsters.

25. In a railway car, the combination of longitudinal side girders spaced apart to provide dumping space therebetween, said girders each comprising a side sill and an intermediate sill both of fishbelly construction, body bolsters extending transversely thereof, diverging members extending from the ends of the car from each side of the longitudinal center thereof and passing through the said bolsters and paralleling the said girders for a limited distance beyond and between bolsters; each of the said members being adapted to incline downwardly in order to have the lower surface thereof disposed co-extensively with the lower surface of the intermediate sills.

26. In a railway car, side girders spaced outwardly from the center of car to provide dumping space therebetween; said girders being formed of intermediate sills and side sills, the intermediate sill having a portion thereof extended upwardly above the level of the top of the side sill and forming a portion of the car floor and the side sills having a portion thereof extended below the level of the intermediate sills.

27. In a railway car, the combination of side girders spaced outwardly from the center of car to provide dumping space therebetween; the said girders being formed of intermediate sills and side sills and having the side sill projecting below the level of the intermediate sill, body bolsters extending transversely of the car and a bracket connecting the projecting portion of the side sill with the bolster at each end thereof.

28. In a railway car, the combination of side girders composed of intermediate sills and side sills and having the side sill projecting below the level of the intermediate sill, bolsters extending transversely of the car and a bracket connection between such projecting portion of the side sills and the body bolsters, such connection being disposed at each end of the body bolsters and connected to the intermediate sill.

29. In a railway car having side discharging doors, the combination with a longitudinal girder composed of a side sill and an intermediate sill; of a side stake secured to the said side sill; a connection between the said stake and girder comprising a plate bent substantially at right angles and having one of the flanges formed thereby extended upwardly into the car and constituting a plow rub plate and having the other flange extending from side sill to intermediate sill.

30. In a railway car having side discharging doors, the combination with a longitudinal girder comprising a side and an intermediate sill, a stake carried by the said girder, a connection between the stake and girder comprising a member having flanges angularly related, one of such flanges being secured to the stake and constituting a plow rub plate, the other flange extending from side sill to intermediate sill and secured to both of these members and having a corrugation pressed therein forming a portion of the floor of the car.

31. In a railway car having side discharging doors, the combination with side stakes, of a longitudinally extending sill having a top horizontal flange, a plate having angularly disposed flanges and a V-shaped corrugation pressed at the junction of the said flanges and constituting a reinforcement therefor, one of such flanges being extended upwardly into the car and secured to the stake thereby forming a plow rub plate and the other of such flanges being secured to the horizontal flange of the side sill.

32. In a railway car having side discharging doors, a side frame including a plurality of upright stakes; a top rail extending from stake to stake, each of the said stakes being composed of two bulb angles disposed back to back.

33. In a railway car adapted to discharge material through the sides, a side stake composed of two bulb angles placed back to back.

34. In a railway car adapted to discharge material through the sides, a side stake composed of two bulb angles placed back to back and riveted together.

35. In a railway car, the combination of a longitudinal side sill, an end sill extending transversely thereof and beyond the same, a connection between the aforesaid members comprising a vertically disposed channel shaped member facing outwardly from the car and having its web secured to the end sill and one of the flanges to the side sill.

36. In a railway car, the combination of a longitudinal side sill, an end sill extending transversely thereof and beyond the same, a connection between the aforesaid members comprising a vertically extending bulb angle.

37. In a railway car, a corner post formed of two vertically disposed bulb angles.

38. In a railway car, a corner post formed of two vertically disposed bulb angles facing outwardly from the car.

39. In a railway car, a corner post formed of two vertically disposed bulb angles facing outwardly from the car and disposed in the same direction longitudinally of the car and a plate connecting the said bulb angles, said plate forming a portion of the car interior wall.

40. In a railway car, the combination in a corner post of two channel shaped members facing outwardly from the car and spaced apart longitudinally of the car and ladder treads extending from one to the other of such members and spaced apart vertically to form a ladder.

41. In a railway car, a ladder formed of two vertically extending bulb angles spaced apart and having a series of ladder treads extending therebetween and secured thereto.

42. In a railway car a corner post construction including two vertically extending bulb angles spaced apart and having a series of ladder treads extending therebetween and secured to the web portion of the said bulb angles, the ladder treads being disposed adjacent to the bulb portion of the angles.

43. In a car adapted to discharge ballast between the rails, the combination with an underframe including side and intermediate longitudinally extending sills; of a longitudinally arranged hopper between the intermediate sills, said hopper including, a fixed sloping side with the lower edge thereof terminating at one side of the longitudinal center line of the car, and a swinging door, the free edge of which cooperates with the terminal edge of the side when the door is in closed position.

44. In a car adapted to discharge ballast between the rails, the combination with an underframe including side and intermediate longitudinally extending sills; of a longitudinally arranged hopper between the intermediate sills, said hopper including, oppositely and downwardly inclined sides meeting to form an apex located to one side of the longitudinal center line of the car, one of said sides including a swinging door.

45. In a car adapted to discharge ballast between the rails, the combination with an underframe including side and intermediate longitudinally extending sills; of a longitudinally arranged hopper between the intermediate sills, said hopper including, a fixed sloping side with the lower edge thereof terminating at one side of the longitudinal center line of the car, and a swinging door, the free edge of which cooperates with the terminal edge of the side when the door is in closed position; and door operating mechanism arranged to adjustably regulate the size of the discharge opening.

46. In a car of the character described, the combination with a car body having fixed, horizontally disposed floor sections along each side and separated by an intervening space; of longitudinally extending sill members beneath said fixed floor sections; and a longitudinally arranged hopper between said fixed floor sections, the apex of said hopper being disposed to one side of the longitudinal center line of the car.

47. In a car of the character described, the combination with a car body having separated horizontal floor sections on each side of the car; of a longitudinally arranged hopper between said floor sections, the apex of the hopper being offset to one side of the longitudinal center line of the car, said hopper including a door; and self-locking door operating mechanism adapted to maintain the door in adjusted open positions.

48. In a car of the character described, the combination with a car body having laterally separated, longitudinally extending floor sections on each side of the car; of a longitudinally arranged hopper between said floor sections, said hopper comprising a fixed sloping side and a hinged sloping side, with the apex of the hopper offset to one side of the longitudinal center line of the car.

49. In a car of the character described, the combination with a car body; of laterally separated longitudinally extending sills; a longitudinally arranged hopper between said laterally separated sills, said hopper including a discharge door pivoted to swing about an axis extending parallel to the length of the car; and cross members extending between and united to said sills, said cross members extending through said hopper and disposed entirely above said door, the tops of said cross members being substantially flush with the tops of said longitudinal sills.

50. In a car of the character described, the combination with an underframe including longitudinally arranged, laterally separated sills and cross members extending between and united to said sills, the ends of said cross members, for their full length, abutting the sides of the longitudinal sills; of a longitudinally arranged hopper between said laterally separated sills, said hopper including a sloping, fixed side wall, and a hinged door, the pivotal axis of the latter being disposed below said cross members.

In witness that I claim the foregoing I have hereunto subscribed my name this 22nd day of August, 1922.

ARGYLE CAMPBELL.

Witnesses:
P. M. MERRICK,
ANN BAKER.